United States Patent
Kobayashi et al.

(10) Patent No.: US 10,254,307 B2
(45) Date of Patent: Apr. 9, 2019

(54) SCANNING PROBE MICROSCOPE

(71) Applicant: SHIMADZU CORPORATION, Kyoto-shi, Kyoto (JP)

(72) Inventors: Kanji Kobayashi, Kyoto (JP); Masato Hirade, Kyoto (JP)

(73) Assignee: SHIMADZU CORPORATION, Kyoto-shi, Kyoto (JP)

(*) Notice: Subject to any disclaimer, the term of this patent is extended or adjusted under 35 U.S.C. 154(b) by 0 days.

(21) Appl. No.: 15/916,469

(22) Filed: Mar. 9, 2018

(65) Prior Publication Data
US 2018/0259552 A1    Sep. 13, 2018

(30) Foreign Application Priority Data
Mar. 10, 2017   (JP) ................. 2017-045904

(51) Int. Cl.
*G01Q 10/04* (2010.01)
*G01Q 20/02* (2010.01)
*G01Q 60/18* (2010.01)

(52) U.S. Cl.
CPC ............ *G01Q 60/18* (2013.01); *G01Q 10/04* (2013.01); *G01Q 20/02* (2013.01)

(58) Field of Classification Search
CPC .......... G01G 60/18; G01G 10/04; G01G 20/02
USPC ................................................. 850/1, 2, 3
See application file for complete search history.

(56) References Cited

FOREIGN PATENT DOCUMENTS

JP       2003-014611 A      1/2003

*Primary Examiner* — Nicole M Ippolito
*Assistant Examiner* — Hanway Chang
(74) *Attorney, Agent, or Firm* — Sughrue Mion, PLLC (57) ABSTRACT

A scanning probe microscope includes: a laser source 61; a photodetector 62; and a Y-drive mechanism 701 provided for at least either the laser source 61 or photodetector 62, for driving the object in a first direction (Y direction) in a plane perpendicular to an optical axis of the object. The Y-drive mechanism 701 includes: a Y-screw shaft 21 extending in the Y direction; a Y-guide shaft 23 extending parallel to the Y-screw shaft; a support member 24 for supporting the object, the support member coupled with the Y-screw shaft 21 via a nut member 211 screwed on the Y-screw shaft 21 as well as coupled with the Y-guide shaft 23 via a slide member 231 mounted on the Y-guide shaft 23 in a slidable manner; and a Y-drive motor 22 for rotating the Y-screw shaft 21.

5 Claims, 6 Drawing Sheets

SCANNING PROBE MICROSCOPE

TECHNICAL FIELD

The present invention relates to a scanning probe microscope, and more specifically, to a scanning probe microscope including a displacement detection unit for optically detecting a mechanical displacement of a cantilever provided with a probe.

BACKGROUND ART

A scanning probe microscope (SPM) has been commonly known as a device for the surface observation, surface roughness measurement or other operations on a piece of metal, semiconductor, ceramic, synthetic resin or various other materials. A representative of the SPM is an atomic force microscope (ATM) which measures an interatomic force that acts between a probe and a sample surface.

In recent years, the so-called "contact mode" and "dynamic mode" have been popularly used as the measurement techniques used in the atomic force microscope. In the dynamic mode, a cantilever provided with a probe is vibrated at or near its resonance point, and the interaction between the probe and the sample surface during the vibration is detected through a change in the amplitude, phase or frequency of the vibration of the cantilever.

Figure 6:
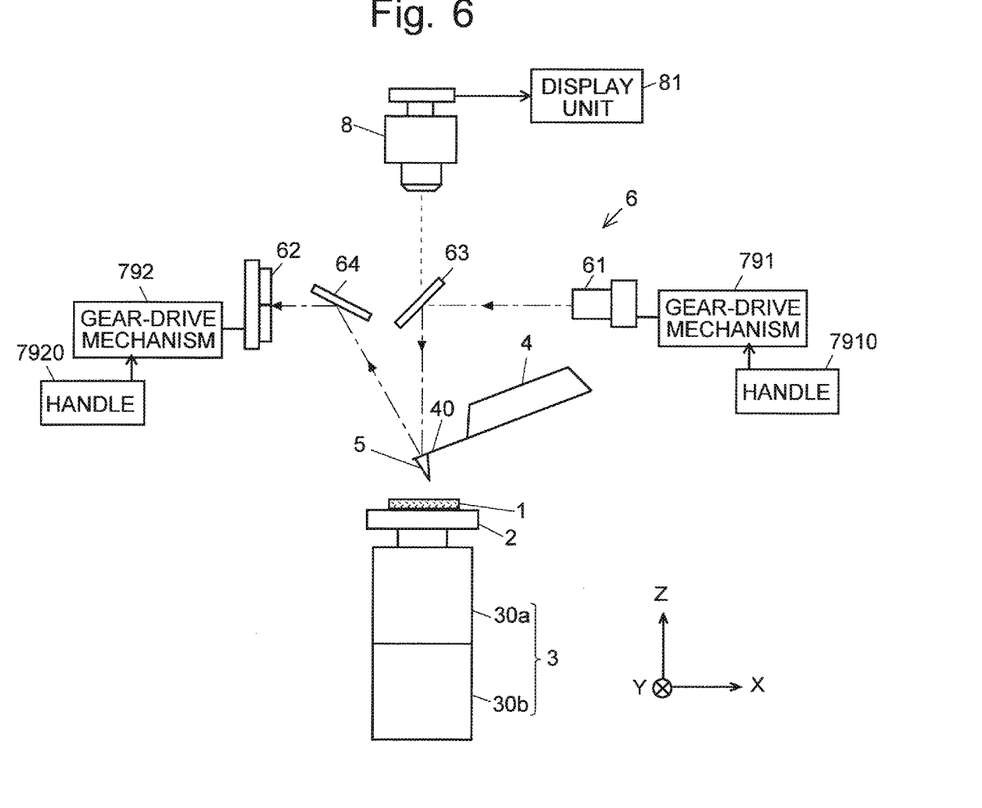
FIG. 6 is a configuration diagram of the main components of a conventional scanning probe microscope.

FIG. 6 shows a configuration of the main components of a common type of scanning probe microscope. A sample 1 to be observed is fixed on a sample stage 2 placed on a tubular scanner 3. The scanner 3 includes: an XY-scanner 30b for driving the sample 1 in the two axial directions of X and Y which are orthogonal to each other; and a Z-scanner 30a for finely changing the position of the sample 1 in the direction of the Z axis which is orthogonal to both the X and Y axes. For each of these scanners, a piezoelectric element which produces a displacement by an externally applied voltage is provided as the drive source. A cantilever 4, with a probe 5 at its tip, is located above the sample 1. The cantilever 4 is vibrated in the vertical direction (Z-axis direction) by an excitation unit (not shown) including a piezoelectric element.

For the detection of the displacement of the cantilever 4 in the Z direction, a displacement detection unit (optical displacement detection unit) 6 including a laser source 61, photodetector 62, half mirror 63, and mirror 64 is provided above the cantilever 4. In the optical displacement detection unit 6, laser light emitted from the laser source 61 is reflected by the half mirror 63 to a substantially perpendicular direction. The reflected light falls onto a reflective surface 40 provided at the back of the tip portion of the cantilever 4. The light reflected by the reflective surface 40 of the cantilever 4 falls onto the photo detector 62 via the mirror 64. For example, the photodetector 62 is provided with a four-segment photodetector having a light-receiving surface divided into four segments arrayed in the Z-axis and Y-axis directions. If the cantilever 4 is displaced in the Z-axis direction, a change occurs in the proportions of the amounts of light incident on those four light-receiving segments. The amount of displacement of the cantilever 4 can be calculated by processing detection signals corresponding to the amounts of light received by the individual light-receiving segments.

A brief description of the measurement operation in the dynamic mode in the scanning probe microscope having the previously described configuration is as follows: The cantilever 4 is vibrated in the Z-axis direction at or near its resonance frequency by the excitation unit (not shown). If an attractive or repulsive force occurs between the probe 5 and the surface of the sample 1 during the vibration, the amplitude of the vibration of the cantilever 4 changes. The slight change in the vibration amplitude is detected through the detection signal produced by the photodetector 62, while a feedback control of the piezoelectric element in the Z-scanner 30a is performed for changing the position of the sample 1 in the Z-axis direction so as to cancel the amount of change in the vibration amplitude, i.e. to maintain the same vibration amplitude. While such a control is continuously perfoimed, the piezoelectric element in the XY-scanner 30b is controlled to change the position of the sample 1 in the X-Y plane and thereby scan the surface of the sample 1 with the probe 5. During this scan, the amount of the feedback control in the Z-axis direction mentioned earlier reflects the unevenness on the surface of the sample 1. Using a signal indicative of the amount of feedback control, a data-processing unit (not shown) creates a surface elevation image of the sample 1.

In such a scanning probe microscope, the positions of the laser source 61 and the photodetector 62 are adjusted so that the incident position of the laser light (the position at which the amount of incident light is highest) reflected by the reflective surface 40 of the cantilever 4 will coincide with the center of the four-segment light-receiving surface of the photodetector 62 under the condition that there is no deflection of the cantilever 4. Such an adjustment in the scanning probe microscope is called the "optical axis adjustment".

For example, a conventional and typical procedure of the optical axis adjustment is as follows: Initially, an image which shows an area around the tip portion of the cantilever 4 viewed from above is taken with a video camera 8 capable of optical microscopic observation. The image is displayed on the screen of a display unit 81. Visually checking this image, an operator adjusts the position of the laser source 61 so that the spot image of laser light on the image comes to an appropriate position on the reflective surface 40 at the tip of the cantilever 4. Specifically, the operator manually adjusts the position of the laser source 61 in the Y and Z directions by operating a handle 7910 of a gear drive mechanism (first gear-drive mechanism) 791, which is provided for the laser source 61 to change its position in each of the two axial directions (Y and Z directions) which are orthogonal to each other in a plane which is perpendicular to the optical axis of the laser source 61. After the position of the laser source 61 has been fixed, the operator adjusts the position (Y and Z positions) of the photodetector 62 so that the spot of the laser light reflected by the reflective surface 40 comes to the center of the four-segment light-receiving surface of the photodetector 62. As in the case of the positional adjustment of the laser source 61, the operator manually adjusts the position of the photodetector 62 by operating a handle 7920 of another gear drive mechanism (second gear-drive mechanism) 792 provided for the photodetector 62.

However, in the previously described mode of the optical adjustment which requires manual operations by an operator, the adjustment accuracy is significantly affected by the skill level of the operator. Furthermore, a considerable amount of time is needed for the adjustment.

To address this problem, a technique for automatically performing the optical axis adjustment has been proposed in Patent Literature 1. In this technique, a controller determines the positional relationship of the cantilever and the light beam based on an optical image (i.e. an optical image including the cantilever and the light beam (actually, the laser beam spot)) taken with a CCD camera, and drives the laser source to such a position (target position) as to make the light beam from the laser light fall onto an appropriate position on the tip portion of the cantilever. Specifically, two stepping motors provided for the laser source (i.e. a stepping motor for driving the laser source along the X axis, and a stepping motor for driving the laser source along the Y axis) are individually controlled to drive the laser source to the target position.

CITATION LIST

Patent Literature

Patent Literature 1: JP 2003-014611 A

SUMMARY OF INVENTION

Technical Problem

In the technique disclosed in Patent Literature 1, since the controller automatically determines the amount of movement (amount of adjustment) necessary for driving an object involved in the optical axis adjustment (laser source or/and photodetector) to the target position, an accurate amount of adjustment can be obtained in a more stable manner than in the case where an operator visually determines that amount. However, even if the amount of adjustment is determined with the highest level of accuracy, the determination will be useless if the mechanism for driving the object cannot exactly change the position of the object by the given amount of adjustment.

This situation should also be considered in the case where the operator visually determines the amount of adjustment on a screen; i.e., even if the required amount of adjustment is recognized by the operator with the highest level of accuracy, the recognition will be useless if the mechanism for driving the object cannot exactly change the position of the object by the amount of adjustment desired by the operator.

The problem to be solved by the present invention is to provide a technique for enabling a scanning probe microscope to perform an optical axis adjustment in which an object whose position needs to be adjusted (laser source or/and photodetector) can be exactly driven by a given amount of adjustment.

Solution to Problem

The present invention developed for solving the previously described problem is a scanning probe microscope including:
  a laser source;
  a photodetector for detecting light emitted from the laser source and reflected by a cantilever; and
  a first drive mechanism provided for at least one of the laser source and the photodetector, for driving the object in a first direction in a plane orthogonal to an optical axis of the object;
where the first drive mechanism includes:
  a first screw shaft extending in the first direction;
  a first guide shaft extending parallel to the first screw shaft;
  a support member for supporting the object, the support member coupled with the first screw shaft via a first nut member screwed on the first screw shaft as well as coupled with the first guide shaft via a first slide member mounted on the first guide shaft in a slidable manner; and
  a first drive motor for rotating the first screw shaft.

The "object" to be driven by the first drive mechanism is a laser source or/and a photodetector for which the first drive mechanism is provided. If the object is the laser source, the "optical axis" of the object is the axis of the light beam emitted from the laser source. If the object is the photodetector, the "optical axis" of the object is the axis of the light beam incident on the photodetector.

According to the present invention, when the first drive motor rotates the first screw shaft, the support member (and the thereby supported object) being guided by the first guide shaft is driven in the predetermined direction by a distance corresponding to the rotation angle of the first screw shaft. The moving distance of the object for a rotation angle of the first screw shaft is dependent on the lead of the same shaft. If a first screw shaft with a sufficiently small lead is used, the moving distance of the object for the rotation angle will be sufficiently short, and the error of the moving distance for an error of the rotation angle will also be sufficiently small. That is to say, the object can be accurately driven in the first direction. Accordingly, the position of the object in the first direction can be exactly changed by a required amount of adjustment by rotating the first screw shaft by a rotation angle which corresponds to that amount of adjustment. This makes it possible to improve the accuracy of the optical axis adjustment.

The "first drive motor" and a "second drive motor" (which will be described later) in the present invention may preferably be a motor that can be numerically controlled. Particularly preferable examples include a pulse motor, stepping motor, servomotor, and ultrasonic motor.

Preferably, the previously described scanning probe microscope may further include:
  a second drive mechanism for driving the object in a second direction intersecting with the first direction in the plane;
where the second drive mechanism includes:
  a second screw shaft extending in the second direction;
  a second guide shaft extending parallel to the second screw shaft;
  a base member for supporting the first drive mechanism, the base member coupled with the second screw shaft via a second nut member screwed on the second screw shaft as well as coupled with the second guide shaft via a second slide member mounted on the second guide shaft in a slidable manner; and
  a second drive motor for rotating the second screw shaft.

According to this mode of the present invention, when the second drive motor rotates the second screw shaft, the base member (and the object supported on the base member via the first drive mechanism) being guided by the second guide shaft is driven in the second direction by a distance corresponding to the rotation angle of the second screw shaft. Once again, if a second screw shaft with a sufficiently small lead is used, the moving distance of the object for the rotation angle of the second screw shaft will be sufficiently short, and the object can be accurately driven in the second direction. Accordingly, the position of the object in the second direction can be exactly changed by a required amount of adjustment by rotating the second screw shaft by a rotation angle which corresponds to that amount of adjustment. Thus, the object can be accurately driven in each of the first and second directions, so that the object can be accurately placed at any position in the plane perpendicular to the optical axis of the object.

In the previously described mode of the present invention, the "second direction" is typically "a direction orthogonal to the first direction".

In a preferable mode of the present invention,
the first drive mechanism and the second drive mechanism are both provided for the laser source as the object; and
the scanning probe microscope further includes:
an imager for imaging a portion illuminated with the light on the cantilever;
a laser source adjustment amount determiner for analyzing image data obtained with the imager, to determine an amount of adjustment for placing the laser source at a target position; and
a drive motor controller for controlling the first drive motor and the second drive motor to rotate the first screw shaft and the second screw shaft by respective rotation angles corresponding to the amount of adjustment.

For example, the "target position of the laser source" is such a position as to make the light beam from the laser source fall onto an appropriate position (e.g. the tip position) on a tip portion of the cantilever.

According to this mode of the present invention, the operatordoes not need to perforin the task of determining the amount of adjustment for the laser source. Accordingly, the period of time required for the optical axis adjustment will be reduced. The problem of the variation of the adjustment accuracy depending on the operator can also be avoided.

In a preferable mode of the present invention,
the first drive mechanism and the second drive mechanism are both provided for the photodetector as the object; and
the scanning probe microscope further includes:
a photodetector adjustment amount determiner for determining an amount of adjustment for placing the photodetector at a target position, based on a detection signal from the photodetector; and
a drive motor controller for controlling the first drive motor and the second drive motor to rotate the first screw shaft and the second screw shaft by respective rotation angles corresponding to the amount of adjustment.

For example, the "target position of the photodetector" is such a position as to make the light reflected by the cantilever fall onto the center of the photodetector.

According to this mode of the present invention, the operator does not need to perform the task of determining the amount of adjustment for the photodetector. Accordingly, the period of time required for the optical axis adjustment will be reduced. The problem of the variation of the adjustment accuracy depending on the operator can also be avoided.

Advantageous Effects of the Invention

According to the present invention, an object whose position needs to be adjusted in an optical axis adjustment of a scanning probe microscope can be exactly driven by a given amount of adjustment.

DESCRIPTION OF EMBODIMENTS

Figure 1:
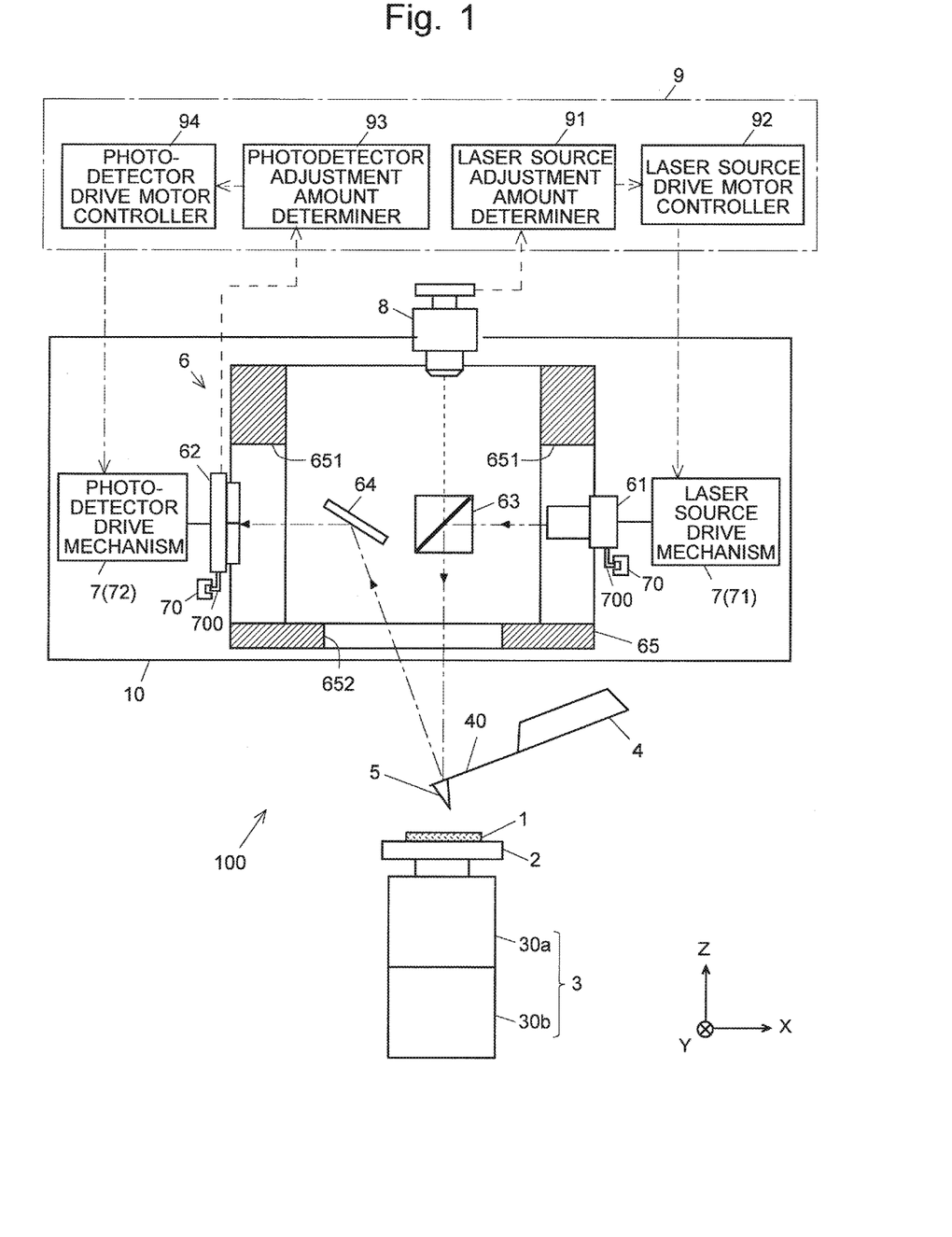
FIG. 1 is a configuration diagram of the main components of a scanning probe microscope according to one embodiment.

An embodiment of the present invention is hereinafter described with reference to the attached drawings.
<1. Overall Configuration>
FIG. 1 shows the main components of a scanning probe microscope 100 according to the present embodiment. In FIG. 1, the components which are identical to those of the conventional scanning probe microscope shown in FIG. 6 are denoted by the same numerals, and detailed descriptions of those components will be omitted.

The scanning probe microscope 100 includes: a sample stage 2 on which a sample 1 to be observed is fixed; a scanner 3 for driving the sample stage 2 in the two axial directions of X and Y as well as finely changing its position in the Z-axis direction; a cantilever 4 located above the sample stage 2; a probe 5 provided at the tip of the cantilever 4; an optical displacement detection unit 6 for detecting a displacement of the cantilever 4 in the Z-axis direction; drive mechanisms 7 for driving objects whose positions need to be adjusted in the optical axis adjustment (in the present embodiment, the laser source 61 and the photodetector 62); a video camera (imager) 8 for taking an image which shows an area around a tip portion of the cantilever 4 from above; and a control unit 9 for controlling the operations of those components.

The optical displacement detection unit 6 includes: a laser source 61; a photodetector 62; a half mirror 63 and a mirror 64 located between the two elements mentioned earlier; and a casing 65 containing these components 61-64. In FIG. 1, the casing 65 is shown by a cross-sectional view.

A through window 651 is formed in each of the two sides facing each other in the casing 65. The laser source 61 and the photodetector 62 are respectively arranged at the two through windows 651, facing each other through the windows. It should be noted that drive mechanisms 71 and 72 (which will be described later) for driving the laser source 61 and the photodetector 62 in the optical axis adjustment are respectively connected to these two components. Each of the through windows 651 has a larger size than the range within which the laser source 61 or photodetector 62 is driven by the drive mechanism 71 or 72. The casing 65 has another through window 652 formed in its bottom side so as to avoid blocking the optical paths between the half mirror 63 and the cantilever 4 as well as between the mirror 64 and the cantilever 4. The upper side of the casing 65 is left open, allowing the video camera 8 to take an image of the cantilever 4.

The optical displacement detection unit 6 detects the displacement of the cantilever 4 in the Z-axis direction as follows: Laser light is emitted from the laser source 61. The laser light is reflected by the half mirror 63 to a substantially perpendicular direction and hits the reflective surface 40 of the cantilever 4. The light reflected by the reflective surface 40 falls onto the photodetector 62 via the mirror 64. The thereby obtained detection signal is processed by the control unit 9 to calculate the amount of displacement of the cantilever 4.

<2. Drive Mechanism 7>

As noted earlier, in the scanning probe microscope 100, a process of adjusting the position of the laser source 61 and that of the photodetector 62 (optical axis adjustment) is performed in advance of the observation of the sample 1 so that the laser light (the portion of the laser light with the highest intensity) reflected by the reflective surface 40 of the cantilever 4 with no deflection falls onto the center of the four-segment light-receiving surface of the photodetector 62.

The scanning probe microscope 100 includes two drive mechanisms for respectively driving the laser source 61 and the photodetector 62 which are both the objects whose positions need to be adjusted in the optical axis adjustment. That is to say, the scanning probe microscope 100 includes a drive mechanism (laser source drive mechanism) 71 for driving the laser source 61 and a drive mechanism (photodetector drive mechanism) 72 for driving the photodetector 62. Both the laser source drive mechanism 71 and the photodetector drive mechanism 72 have the same configuration. They are hereinafter simply called the "drive mechanism(s) 7".

The casing 65 of the optical displacement detection unit 6 is contained in a casing (outer casing) 10 of the scanning probe microscope 100. The drive mechanisms 7 are located outside the casing 65 as well as inside the outer casing 10. As noted earlier, the laser source drive mechanism 71 and the photodetector drive mechanism 72 are both composed of the same elements. However, the layout of those elements is different: they are located at the same positions in the Z and Y directions and opposite positions in only the X direction. In other words, the elements in the laser source drive mechanism 71 and the corresponding elements in the photodetector drive mechanism 72 are located at the same positions on the YZ plane. Such a configuration improves the spatial use efficiency and allows for the downsizing of the entire scanning probe microscope 100.

Figure 2:
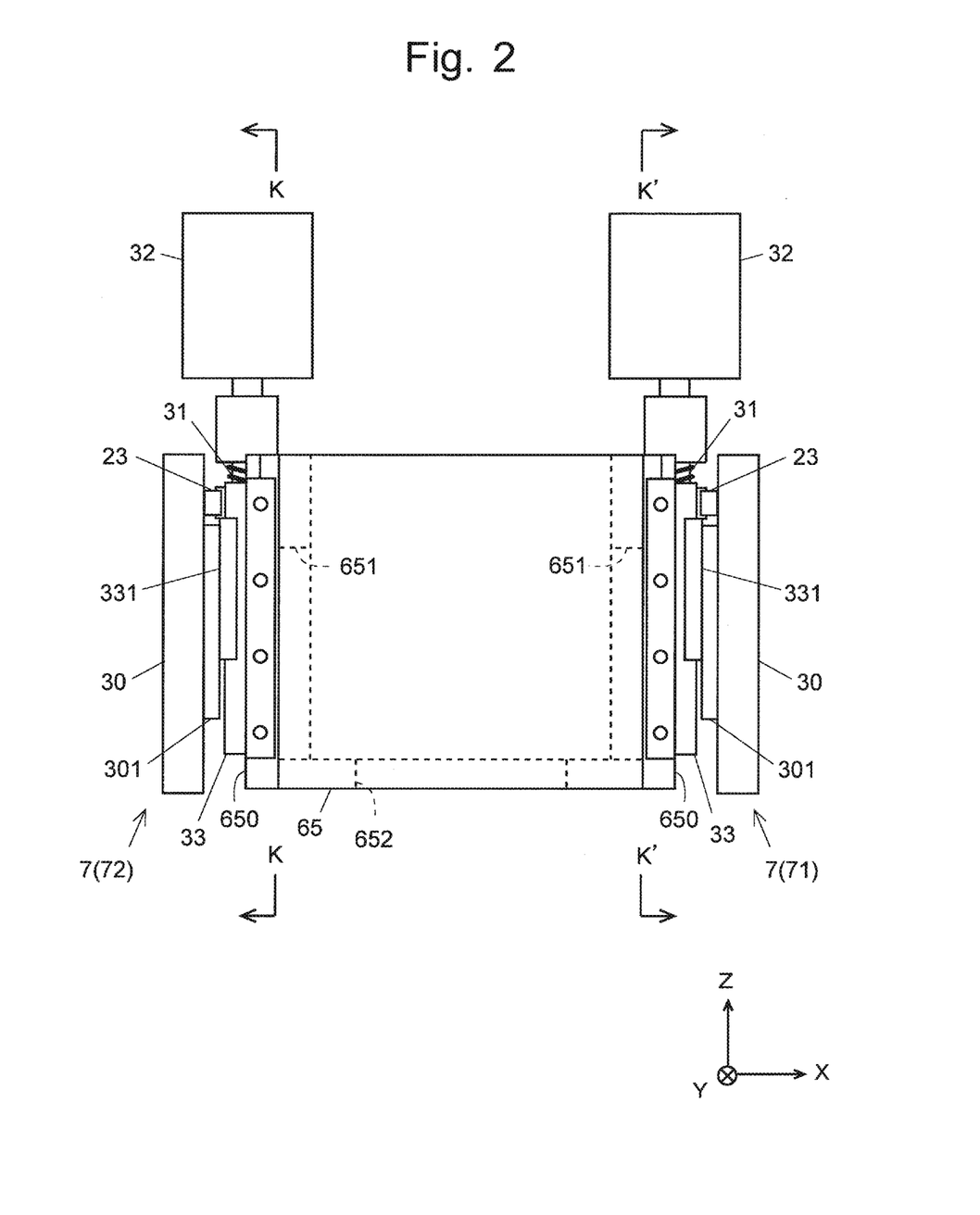
FIG. 2 is a side view of a casing viewed from its outside.
Figure 3:
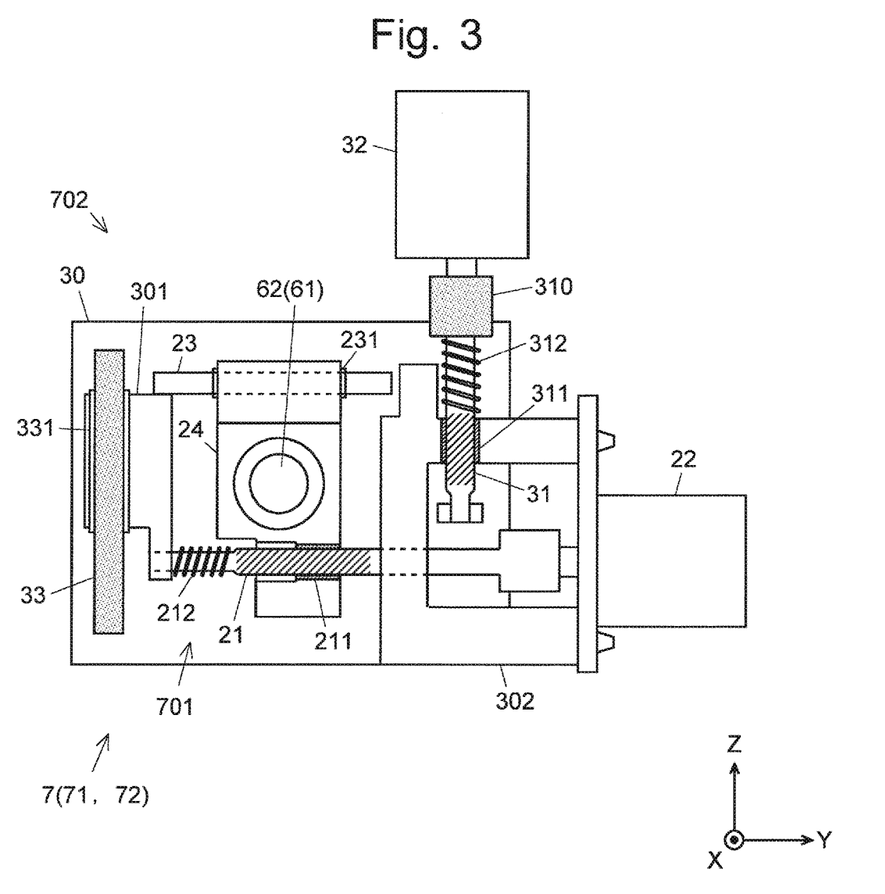
FIG. 3 is a view of FIG. 2 observed in the direction of arrow K.

The configuration of the drive mechanism 7 is hereinafter described with reference to FIGS. 2 and 3. FIG. 2 is a side view of the casing 65 observed from the outside. FIG. 3 is a view of FIG. 2 observed in the direction of arrow K. It should be noted that the "X direction" in the drawings and the following descriptions is defined as the direction which extends along the axis of the light beam emitted from the laser source 61 and that of the light beam incident on the photodetector 62. As described earlier, the laser source drive mechanism 71 and the photodetector drive mechanism 72 have the same configuration with their elements laid out in a mirror-reversed form. Accordingly, a view of FIG. 2 observed in the direction of arrow K' will be a mirror-reversed image of FIG. 3.

The drive mechanism 7 includes: a first drive mechanism (Y-drive mechanism) 701 for driving the object (laser source 61 or photodetector 62) in the first direction (Y direction) in a plane (YZ plane) orthogonal to the optical axis of the object; and a second drive mechanism (Z-drive mechanism) 702 for driving the same object in the second direction (Z direction) which is in the same plane and is orthogonal to the first direction.

<Y-Drive Mechanism 701>

The Y-drive mechanism 701 is a mechanism for driving the object in the Y direction. It includes: a Y-screw shall 21 extending in the Y direction; a Y-drive motor 22 for rotating the Y-screw shaft 21; a Y-guide shaft 23 extending parallel to the Y-screw shaft 21; and a support member 24 for supporting object 61 or 62. The Y-drive motor 22 is electrically connected to the control unit 9 and rotates by the rotation angle given from the control unit 9 (i.e. its rotation is numerically controlled). For example, the Y-drive motor 22 can specifically be configured using a pulse motor, stepping motor, servomotor or ultrasonic motor.

The support member 24 is coupled with the Y-screw shaft 21 via a nut member 211 screwed on the Y-screw shaft 21, as well as coupled with the Y-guide shaft 23 via a slide member 231 (specifically, for example, a ball bearing) mounted on the Y-guide shaft 23 in a slidable manner.

The Y-drive mechanism 701 configured in the previously described manner is supported on a plate-shaped base member 30 placed in a position parallel to and separate from the outer surface (YZ outer surface) 650 which is parallel to the YZ surface in the casing 65. In other words, the Y-guide shall 23 is laid on the base member 30. An auxiliary support member 301 and a frame member 302 are fixed on the −Y and +Y sides of the base member 30, respectively. The Y-screw shaft 21 has its −Y-end portion passed through the auxiliary support member 301 and a portion near its +Y-end passed through the frame member 302, with each portion held in a rotatable manner via a bearing or similar device. The Y-drive motor 22 connected to the +Y end of the Y-screw shaft 21 is fixed to the frame member 302 by means of screws or similar fixtures. The Y-screw shaft 21 has a smaller diameter in its −Y-end portion than in the other portions. A coil spring 212 is fitted on the outer surface of this portion so that the Y-screw shaft 21 is axially biased by this coil spring 212. Thus, the Y-screw shaft 21 is firmly held and thereby prevented from being axially displaced in relation to the base member 30.

In this configuration, when a rotation angle is given from the control unit 9 to the Y-drive motor 22, the Y-drive motor 22 rotates the Y-screw shaft 21 by the given rotation angle. The support member 24 coupled with this shaft via the nut member 211 (and the thereby supported object 61 or 62) is thereby driven in the Y direction in relation to the base member 30 by a distance corresponding to the rotation angle, being guided by the Y-guide shaft 23. The moving distance of object 61 or 62 for the rotation angle of the Y-screw shaft 21 is dependent on the lead of the same shaft 21. If a Y-screw shaft 21 with a sufficiently small lead is used, the moving distance of object 61 or 62 for the rotation angle will be sufficiently short, and the error of the moving distance for an error of the rotation angle will also be sufficiently small. That is to say, object 61 or 62 can be accurately driven in the Y direction. Accordingly, the position of object 61 or 62 in the Y direction can be exactly changed by a required amount of adjustment by rotating the Y-screw shaft 21 by a rotation angle which corresponds to that amount of adjustment. In other words, object 61 or 62 can be accurately driven to the desired Y-position on the base member 30.

<Z-Drive Mechanism 702>

The Z-drive mechanism 702 is a mechanism for driving the object in the Z direction. It includes: a Z-screw shaft 31 extending in the Z direction; a Z-drive motor 32 for rotating the Z-screw shaft 31; and a Z-guide shaft 33 extending parallel to the Z-screw shaft 31. The Z-drive motor 32 is electrically connected to the control unit 9 and rotates by the rotation angle given from the control unit 9 (i.e. its rotation is numerically controlled). As with the Y-drive motor 22, the Z-drive motor 32 can specifically be configured using a pulse motor, stepping motor, servomotor or ultrasonic motor.

The Z-guide shaft 33 has its +X side laid on the YZ outer surface 650 of the casing 65 (in FIG. 3, the members fixed to the YZ outer surface 650 are indicated by the stippled pattern). On the −X side of the Z-guide shaft 33, a slide member 331 (specifically, for example, a ball bearing) is mounted in a slidable manner. This member is connected to the base member 30 (more specifically, to the auxiliary support member 301).

The Z-screw shaft 31 has its +X side fixed to the YZ outer surface 650 of the casing 65 via a fixture member 310. A nut member 311 is screwed on the Z-screw shaft 31, with the base member 30 (more specifically, the frame member 302) connected to the −X-side surface of the nut member 311. A coil spring 312 sandwiched between the frame member 302 and the fixture member 310 is fitted on the outer surface of a +Z-end portion of the Z-screw shaft 31 so that the Z-screw shaft 31 is axially biased by the coil spring 312. Thus, the Z-screw shaft 31 is firmly held and thereby prevented from being axially displaced.

In this configuration, when a rotation angle is given from the control unit 9 to the Z-drive motor 32, the Z-drive motor 32 rotates the Z-screw shaft 31 by the given rotation angle. The base member 30 coupled with this shaft via the nut member 311 (and the thereby supported object 61 or 62) is thereby driven in the Z direction in relation to the casing 65 by a distance corresponding to the rotation angle, being guided by the Z-guide shaft 33. The moving distance of object 61 or 62 for the rotation angle of the Z-screw shaft 31 is dependent on the lead of the same shaft 31. If a Z-screw shaft 31 with a sufficiently small lead is used, the moving distance of object 61 or 62 for the rotation angle will be sufficiently short, and the error of the moving distance for an error of the rotation angle will also be sufficiently small. That is to say, object 61 or 62 can be accurately driven in the Z direction. Accordingly, the position of object 61 or 62 in the Z direction can be exactly changed by a required amount of adjustment by rotating the Z-screw shaft 31 by a rotation angle which corresponds to that amount of adjustment. In other words, the base member 30 can be accurately driven to the desired Z-position. As described earlier, object 61 or 62 can also be accurately driven to the desired Y-position on the base member 30 by the Y-drive mechanism 701. Thus, object 61 or 62 can be accurately driven to any target position in the YZ plane by the two drive mechanisms 701 and 702.

<3. Functional Elements Related to Optical Axis Adjustment>

Once more referring to FIG. 1, the control unit 9 includes a laser source adjustment amount determiner 91, laser source drive motor controller 92, photodetector adjustment amount determiner 93, and photodetector drive motor controller 94 as the functional elements related to the optical axis adjustment. It should be noted that the control unit 9 is actually a personal computer, on which the aforementioned functional elements (functional blocks) are embodied, for example, by a CPU executing a program for controlling a scanning probe microscope. Though not shown, a display unit and input unit are connected to the control unit The laser source adjustment amount determiner 91 determines the amount of adjustment for the laser source 61. Specifically, the laser source adjustment amount determiner 91 commands the video camera 8 to take an image of an area around the tip of the cantilever 4 (the portion of the cantilever 4 illuminated with the laser light) from above, analyzes the obtained image data, and deter mmines the tip position of the cantilever 4 as well as the position illuminated with the laser light (the position of the spot image). Then, the laser source adjustment amount determiner 91 determines the amounts of adjustment, i.e. the amount of adjustment in the Y direction (Y-adjustment amount) and that of the adjustment in the Z direction (Z-adjustment amount), which are necessary for placing the laser source 61 at the target position, i.e. such a position of the laser source 61 as to make the spot image of the laser light come to an appropriate position on the tip portion of the cantilever 4. For example, if the target position of the laser source 61 is such a position as to make the spot image of the laser light be located at the tip position of the cantilever 4, the positional difference between the tip point of the cantilever 4 and the point of illumination with the laser light is calculated in each of the two axial directions (X and Y directions) orthogonal to each other on the plane of the image. Then, the values of the positional difference in the X and Y directions (or actual lengths obtained by converting those difference values) are obtained as the Z-adjustment amount and the Y-adjustment amount, respectively.

Based on the amounts of adjustment determined by the laser source adjustment amount determiner 91, the laser source drive motor controller 92 controls the drive motors 22 and 32 in the laser source drive mechanism 71 to rotate the screw shafts 21 and 31 by respective rotation angles corresponding to the amount of adjustment. Specifically, the laser source drive motor controller 92 converts the Y-adjustment amount determined by the laser source adjustment amount determiner 91 into a driving quantity for the Y-drive motor 22 (more specifically, it calculates the rotation angle of the Y-screw shaft 21 necessary for driving the laser source 61 by the detei mined Y-adjustment amount) and controls the Y-drive motor 22 based on the driving quantity to rotate the Y-screw shaft 21 by the calculated rotation angle. Similarly, the laser source drive motor controller 92 converts the Z-adjustment amount determined by the laser source adjustment amount determiner 91 into a driving quantity for the Z-drive motor 32 (more specifically, it calculates the rotation angle of the Z-screw shaft 31 necessary for driving the laser source 61 by the determined Z-adjustment amount) and controls the Z-drive motor 32 based on the driving quantity to rotate the Z-screw shaft 31 by the calculated rotation angle.

The photodetector adjustment amount determiner 93 determines the amount of adjustment for the photodetector 62. Specifically, the photodetector adjustment amount determiner 93 obtains detection signals from the photodetector 62 and determines the incident position of the laser light (i.e. the position at which the amount of incident light is highest). For example, the incident position can be determined by comparing the intensities of the incident light on the segments of the light-receiving surface of the photodetector 62. Then, the photodetector adjustment amount determiner 93 determines the amounts of adjustment, i.e. the amount of adjustment in the Y direction (Y-adjustment amount) and that of the adjustment in the Z direction (Z-adjustment amount), which are necessary for placing the photodetector 62 at the target position, i.e. such a position of the photodetector 62 as to make the laser light fall onto the center of the four-segment light-receiving surface of the photodetector 62. For example, the positional difference between the center of the photodetector 62 and the incident point of the laser light is calculated in each of the two axial directions (Y and Z directions) orthogonal to each other on the plane of the photodetector 62. Then, the values of the positional difference in the Y and Z directions (or actual lengths obtained by converting those difference values) are obtained as the Y-adjustment amount and the Z-adjustment amount, respectively.

Based on the amounts of adjustment detei mined by the photodetector adjustment amount determiner 93, the photodetector drive motor controller 94 controls the drive motors 22 and 32 in the photodetector drive mechanism 72 to rotate the screw shafts 21 and 31 by respective rotation angles corresponding to the amount of adjustment. Specifically, the photodetector drive motor controller 94 converts the Y-adjustment amount determined by the photodetector adjustment amount determiner 93 into a driving quantity for the Y-drive motor 22 (more specifically, it calculates the rotation angle of the Y-screw shaft 21 necessary for driving the photodetector 62 by the determined Y-adjustment amount) and controls the Y-drive motor 22 based on the driving quantity to rotate the Y-screw shaft 21 by the calculated rotation angle. Similarly, the photodetector drive motor controller 94 converts the Z-adjustment amount determined by the photodetector adjustment amount determiner 93 into a driving quantity for the Z-drive motor 32 (more specifically, it calculates the rotation angle of the Z-screw shaft 31 necessary for driving the photodetector 62 by the determined Z-adjustment amount) and controls the Z-drive motor 32 based on the driving quantity to rotate the Z-screw shaft 31 by the calculated rotation angle.

<4. Process Flow Related to Optical Axis Adjustment>

Figure 4:
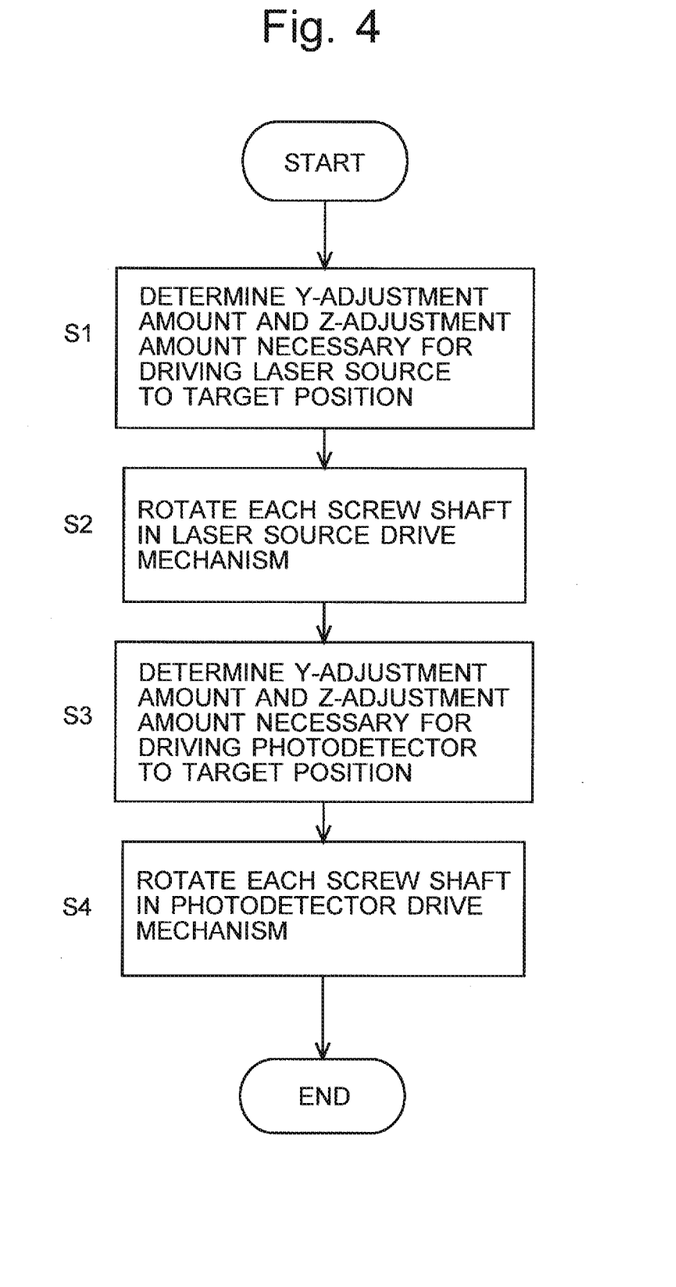
FIG. 4 is a flowchart of the optical axis adjustment.

The flow of the optical axis adjustment performed in the scanning probe microscope 100 is hereinafter described with reference to FIG. 4. FIG. 4 is a flowchart of the optical axis adjustment. The sequence of processes hereinafter described are performed when a command for the execution of the optical axis adjustment is issued by an operator from the input unit.

In advance of the optical axis adjustment, an operation for detecting the origins of the laser source 61 and the photosensor 62 is performed. The origin detection is performed by using limit sensors (specifically, for example, transmission photoelectric sensors) 70 (see FIG. 1) which are provided at predetermined positions in the scanning probe microscope 100 for detecting the position of the origin in each of the Y and Z directions of the laser light source 61 (and photodetector 62). For example, in the case of the origin detection for the laser source 61 in the Y direction, the Y-drive mechanism 701 drives the laser source 61 in the Y direction. The limit sensor 70 located at the predeteiinined position in the Y direction detects a detection target portion 700 (i.e. the detection target portion 700 fixed to the laser source 61) when the laser source 61 reaches a specific Y-position. This Y-position (or a position which is at a predetemiined positional relation to the detected position) is stored as the position of the origin. The origin detection for the laser source 61 in the Z direction, as well as the origin detections for the photodetector 62 in the Y and Z directions, are also similarly performed. After the position of the origin on each axis has been located, a previously specified movable distance is added to that position to further determine the limit position of the movable range on each axis. It is also possible to provide another limit sensor 70 for locating the limit position of the movable range in addition to the limit sensor 70 for locating the position of the origin. In the optical axis adjustment which will be hereinafter described, the laser source adjustment amount determiner 91 and the photodetector adjustment amount determiner 93 refer to the positions of the origins and the limit positions of the movable ranges detected in the previously described manner, to determine the required amounts of adjustment and other quantities.

In the optical axis adjustment, the laser source adjustment amount determiner 91 initially commands the video camera 8 to take an image of an area around the tip of the cantilever 4 from above, analyzes the obtained image data, and determines the Y-adjustment amount and Z-adjustment mount necessary for placing the laser source 61 at the target position (Step S1).

Subsequently, the laser source drive motor controller 92 converts the amounts of adjustment determined in Step S1 into driving quantities for the laser source drive mechanism 71 and controls the same mechanism 71 based on those driving quantities to rotate each of the screws 21 and 31 by a predetermined rotation angle, i.e. by a rotation angle necessary for driving the laser source 61 to the target position (Step S2). As already explained, the laser source drive mechanism 71 can accurately drive the laser source 61 in each of the Y and Z directions. Accordingly, the laser source 61 can be placed at the target position with a high level of accuracy. Consequently, a highly accurate optical axis adjustment is achieved.

Subsequently, the photodetector adjustment amount determiner 93 obtains detection signals from the photodetector 62 and determines the Y-adjustment amount and Z-adjustment amount necessary for placing the photodetector 62 at the target position based on the incident position of the laser light (Step S3).

Subsequently, the photodetector drive motor controller 94 converts the amounts of adjustment determined in Step S3 into driving quantities for the photodetector drive mechanism 72 and controls the same mechanism 72 based on those driving quantities to rotate the screws 21 and 31 by respective predetermined rotation angles, i.e. by the rotation angles necessary for driving the photodetector 62 to the target position (Step S4). As already explained, the photodetector drive mechanism 72 can accurately drive the photodetector 62 in each of the Y and Z directions. Accordingly, the photodetector 62 can be placed at the target position with a high level of accuracy. Consequently, a highly accurate optical axis adjustment is achieved.

In addition, whether or not the laser source 61 is located at the target position (more specifically, within a permissible error range from the target position) may be determined after the process of Step S2 (or after the process of Step S4). Specifically, this can be achieved by commanding the video camera 8 to take an image of an area around the tip of the cantilever 4, and determining whether or not the spot image of the laser light is located at the appropriate position on the tip of the cantilever 4 (more specifically, within a permissible error range from the appropriate position). If a positive determination result has not been obtained, the processes of Steps S1 and S2 (or Steps S1 through S4) can be performed once more.

Similarly, whether or not the photodetector 62 is located at the target position may be determined after the process of Step S4. Specifically, this can be achieved by locating the incident position of the laser light on the photodetector 62 and determining whether or not the incident position is within a pei niissible error range from the center of the four-segment light-receiving surface of the photodetector 62. If a positive determination result has not been obtained, the processes of Steps S3 and S4 can be performed once more.

<5. Another Embodiment>

Figure 5:
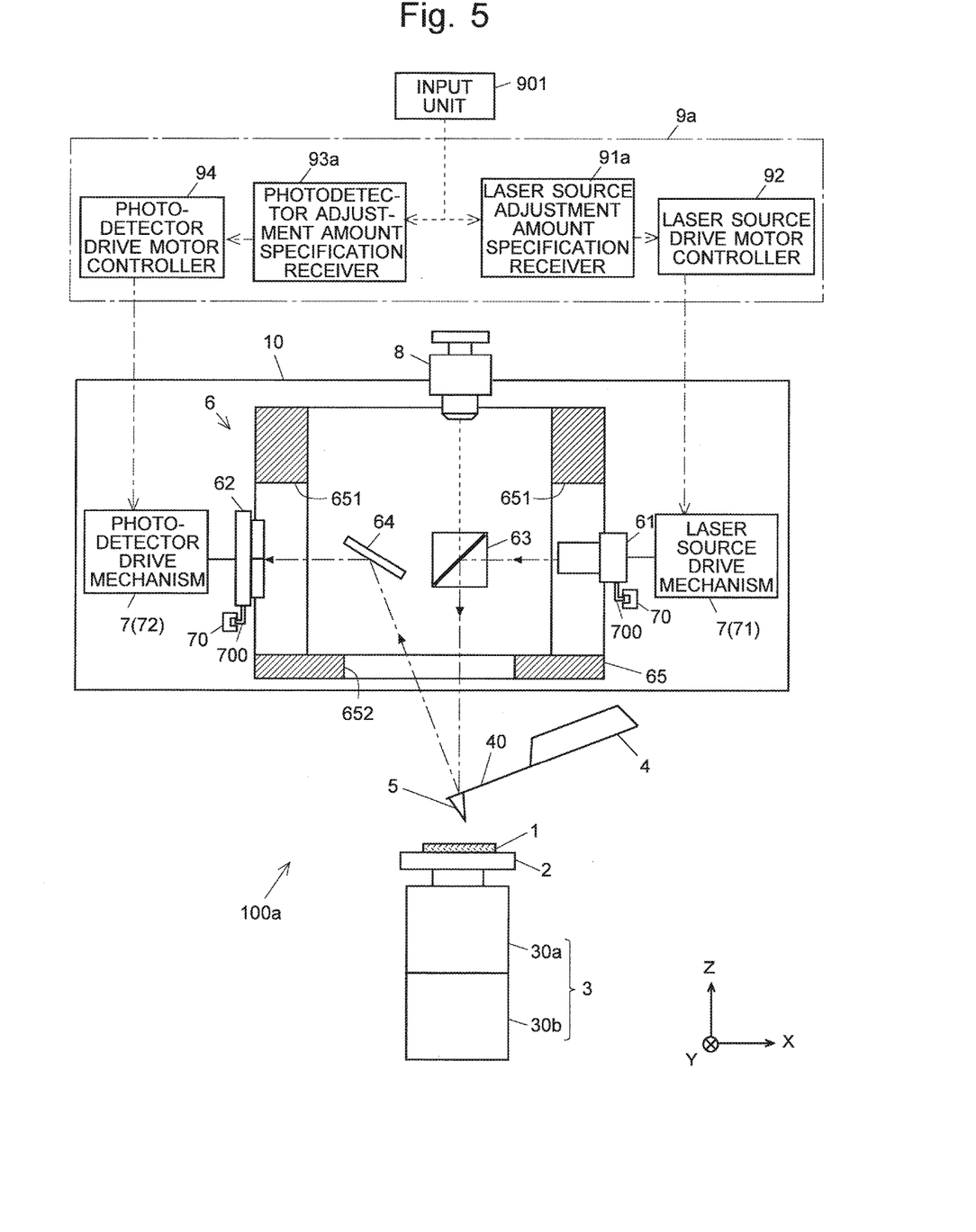
FIG. 5 is a configuration diagram of the main components of a scanning probe microscope according to another embodiment.

In the previous embodiment, the amounts of adjustment for the laser source 61 and the photodetectors 62 related to the optical axis adjustment are deter mined by the control unit 9. It is also possible to allow users to specify the amounts of adjustment. FIG. 5 shows the main components of the scanning probe microscope 100a according to the present embodiment. In FIG. 5, the components which are identical to those of the scanning probe microscope 100 shown in FIG. 1 are denoted by the same numerals, and descriptions of those components will be omitted.

The control unit 9a in the present scanning probe microscope 100a includes a laser source adjustment amount specification receiver 91a in place of the laser source adjustment amount deter miner 91, as well as a photodetector adjustment amount specification receiver 93a in place of the photodetector adjustment amount determiner 93. The laser source adjustment amount specification receiver 91a and the photodetector adjustment amount specification receiver 93a each receive numerical values given by an operator from the input unit 901 as the amounts of adjustment for the laser source 61 (or photodetector 62).

In the previous embodiments, the laser source 61 and the photodetector 62 are both subjected to the position adjustment in the process of the optical axis adjustment. It is possible to perform the position adjustment on only either the laser source 61 or photodetector 62. In this case, the drive mechanism 7 needs to be provided for only the component which should be subjected to the position adjustment. That is to say, it is not always necessary to provide the drive mechanism 7 for both the laser source 61 and the photodetector 62; a configuration with the drive mechanism 7 provided for only one of them is also possible.

REFERENCE SIGNS LIST 100, 100a . . . Scanning Probe Microscope
1 . . . Sample
2 . . . Sample Stage
3 . . . Scanner
   30a . . . Z-Scanner
   30b . . . XY-Scanner
4 . . . Cantilever
   40 . . . Reflective Surface
5 . . . Probe
6 . . . Optical Displacement Detection Unit
   61 . . . Laser Source
   62 . . . Photodetector
   63 . . . Half Mirror
   64 . . . Mirror
   65 . . . Casing
   651, 652 . . . Through Window
7 . . . Drive Mechanism
   701 . . . Y-Drive Mechanism
   21 . . . Y-Screw Shaft
   211 . . . Nut Member
   212 . . . Coil Spring
   22 . . . Y-Drive Motor
   23 . . . Y-Guide Shaft
   231 . . . Slide Member
   24 . . . Support Member
   702 . . . Z-Drive Mechanism
   30 . . . Base Member
   301 . . . Auxiliary Support Member
   302 . . . Frame Member
   31 . . . Z-Screw Shaft
   310 . . . Fixture Member
   311 . . . Nut Member
   312 . . . Coil Spring
   32 . . . Z-Drive Motor
   33 . . . Z-Guide Shaft
   331 . . . Slide Member
70 . . . Limit Sensor
71 . . . Laser Source Drive Mechanism
72 . . . Photodetector Drive Mechanism
8 . . . Video Camera
9, 9a . . . Control Unit
   91 . . . Laser Source Adjustment Amount Determiner
   91a . . . Laser Source Adjustment Amount Specification Receiver
   92 . . . Laser Source Drive Motor Controller
   93 . . . Photodetector Adjustment Amount Determiner
   93a . . . Photodetector Adjustment Amount Specification Receiver
   94 . . . Photodetector Drive Motor Controller

The invention claimed is:

1. A scanning probe microscope, comprising:
a laser source;
a photodetector for detecting light emitted from the laser source and reflected by a cantilever; and
a first drive mechanism provided for at least one of the laser source and the photodetector, for driving an object in a first direction in a plane orthogonal to an optical axis of the object;
wherein the first drive mechanism comprises:
a first screw shaft extending in the first direction;
a first guide shaft extending parallel to the first screw shaft;
a support member for supporting the object, the support member coupled with the first screw shaft via a first nut member screwed on the first screw shaft as well as coupled with the first guide shaft via a first slide member mounted on the first guide shaft in a slidable manner; and
a first drive motor for rotating the first screw shaft.

2. The scanning probe microscope according to claim 1, further comprising:
a second drive mechanism for driving the object in a second direction intersecting with the first direction in the plane;
wherein the second drive mechanism comprises:
a second screw shaft extending in the second direction;
a second guide shaft extending parallel to the second screw shaft;
a base member for supporting the first drive mechanism, the base member coupled with the second screw shaft via a second nut member screwed on the second screw shaft as well as coupled with the second guide shaft via a second slide member mounted on the second guide shaft in a slidable manner; and
a second drive motor for rotating the second screw shaft.

3. The scanning probe microscope according to claim 2, wherein:
the first drive mechanism and the second drive mechanism are both provided for the laser source as the object; and
the scanning probe microscope further comprises:
an imager for imaging a portion illuminated with the light on the cantilever;
a laser source adjustment amount determiner for analyzing image data obtained with the imager, to determine an amount of adjustment for placing the laser source at a target position; and
a drive motor controller for controlling the first drive motor and the second drive motor to rotate the first screw shaft and the second screw shaft by respective rotation angles corresponding to the amount of adjustment.

4. The scanning probe microscope according to claim 3, wherein:
the first drive mechanism and the second drive mechanism are both provided for the photodetector as the object; and the scanning probe microscope further comprises:
- a photodetector adjustment amount determiner for determining an amount of adjustment for placing the photodetector at a target position, based on a detection signal from the photodetector; and
- a drive motor controller for controlling the first drive motor and the second drive motor to rotate the first screw shaft and the second screw shaft by respective rotation angles corresponding to the amount of adjustment.

5. The scanning probe microscope according to claim 2, wherein:
- the first drive mechanism and the second drive mechanism are both provided for the photodetector as the object; and
- the scanning probe microscope further comprises:
  - a photodetector adjustment amount determiner for detei lining an amount of adjustment for placing the photodetector at a target position, based on a detection signal from the photodetector; and
  - a drive motor controller for controlling the first drive motor and the second drive motor to rotate the first screw shaft and the second screw shaft by respective rotation angles corresponding to the amount of adjustment.

* * * * *